US011433538B2

(12) United States Patent
Terada

(10) Patent No.: US 11,433,538 B2
(45) Date of Patent: Sep. 6, 2022

(54) TRAJECTORY GENERATION SYSTEM AND TRAJECTORY GENERATING METHOD

(71) Applicant: Toyota Jidosha Kabushiki Kaisha, Toyota (JP)

(72) Inventor: Koji Terada, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 221 days.

(21) Appl. No.: 16/682,415

(22) Filed: Nov. 13, 2019

(65) Prior Publication Data

US 2020/0189101 A1   Jun. 18, 2020

(30) Foreign Application Priority Data

Dec. 14, 2018  (JP) .............................. JP2018-234297

(51) Int. Cl.
  *B25J 9/16* (2006.01)
  *B25J 19/02* (2006.01)

(52) U.S. Cl.
  CPC ........... *B25J 9/1664* (2013.01); *B25J 9/1653* (2013.01); *B25J 9/1666* (2013.01); *B25J 19/023* (2013.01); *G05B 2219/40519* (2013.01)

(58) Field of Classification Search
  CPC ...... B25J 9/1664; B25J 9/1653; B25J 9/1666; B25J 9/1674; B25J 9/1602; B25J 19/023; B25J 9/1656; G05B 2219/40519; G05B 2219/40523; G05B 2219/40552
  See application file for complete search history.

(56) References Cited

U.S. PATENT DOCUMENTS

| 9,770,823 | B2 * | 9/2017 | Huang | B25J 11/002 |
| 2004/0243280 | A1 | 12/2004 | Bash et al. | |
| 2006/0111820 | A1 * | 5/2006 | Goetting | B62D 13/06 701/1 |
| 2018/0236657 | A1 * | 8/2018 | Kuwahara | B25J 9/1671 |
| 2019/0009412 | A1 * | 1/2019 | Khan | B25J 9/04 |

(Continued)

FOREIGN PATENT DOCUMENTS

| EP | 2881829 A2 * | 6/2015 | ......... B60W 30/085 |
| JP | 2010-131751 A | 6/2010 | |

(Continued)

*Primary Examiner* — Abby Y Lin
*Assistant Examiner* — Karston G. Evans
(74) *Attorney, Agent, or Firm* — Dinsmore & Shohl LLP

(57) ABSTRACT

A trajectory generation system includes a computing unit that generates a trajectory on which a mobile body or a gripper moves from a start position to a target position, and an evaluating unit that evaluates a plurality of trajectory candidates. The computing unit generates the trajectory candidates leading to a target area including the target position and its vicinity, with a plurality of degrees of freedom associated with predetermined grip conditions, within at least one of a range in which the candidates can be computed in a predetermined period, a range in which they can be computed in a predetermined processing amount, and a range in which a predetermined number of trajectory candidates can be computed. The evaluating unit conducts evaluation of the trajectory candidates generated, based on an evaluation item, and the computing unit generates the trajectory, using one trajectory candidate selected based on the evaluation.

9 Claims, 7 Drawing Sheets

(56) References Cited

U.S. PATENT DOCUMENTS

| | | | |
|---|---|---|---|
| 2019/0184561 A1* | 6/2019 | Yip | G06N 5/046 |
| 2019/0240833 A1* | 8/2019 | Kimura | B25J 9/0081 |
| 2019/0314989 A1* | 10/2019 | Sokabe | B25J 9/1664 |
| 2019/0337154 A1* | 11/2019 | Holson | B25J 9/1671 |
| 2019/0340937 A1* | 11/2019 | Villa | G08G 5/0043 |
| 2020/0030977 A1 | 1/2020 | Diankov | |
| 2020/0391384 A1* | 12/2020 | Cohen | G05D 1/024 |
| 2021/0323153 A1* | 10/2021 | Chestnutt | B25J 19/021 |

FOREIGN PATENT DOCUMENTS

| | | |
|---|---|---|
| JP | 5724919 B2 | 5/2015 |
| JP | 2017-042868 A | 3/2017 |
| JP | 2017-529631 A | 10/2017 |
| JP | 2018-062261 A | 4/2018 |
| JP | 6436604 B2 | 12/2018 |
| WO | 2013/140236 A1 | 9/2013 |
| WO | 2016010614 A1 | 1/2016 |
| WO | 2016/050274 A1 | 4/2016 |
| WO | 2017139613 A1 | 8/2017 |
| WO | 2018143003 A1 | 8/2018 |
| WO | 2018185852 A1 | 10/2018 |

* cited by examiner

FIG. 4

| GOAL OR PATH | HARD OR SOFT | EXAMPLE |
|---|---|---|
| GOAL | HARD | STATE IN WHICH MOBILE BODY MUST BE PLACED AT END OF TRAJECTORY<br>ex. GRIPPER IS LOCATED AT POSITION WHERE OBJECT CAN BE GRIPPED |
| GOAL | SOFT | CONDITION DESIRED TO BE FULFILLED BY MOBILE BODY AT END OF TRAJECTORY<br>ex. POSTURE OF MOBILE BODY IS NOT EXTENDED |
| PATH | HARD | STATE IN WHICH MOBILE BODY MUST BE PLACED OVER ENTIRE LENGTH OF TRAJECTORY<br>ex. STRAIGHT-LINE TRAJECTORY WHEN PULLING DRAWER |
| PATH | SOFT | CONDITION DESIRED TO BE FULFILLED BY MOBILE BODY OVER ENTIRE LENGTH OF TRAJECTORY<br>ex. KEPT FROM MOVING HAND AS FAR AS POSSIBLE |

| TYPE OF RESTRAINT CONDITION | EXAMPLE |
|---|---|
| TSR | KEEP POSITIONS AND POSTURES OF LINKS, GRIPPER, ETC. WITHIN GIVEN RANGES |
| RangeJoint | KEEP DIRECTIONS OF JOINTS AND MOBILE BODY WITHIN GIVEN RANGES |
| Visibility | KEEP ANGLE OF VIEW OF CAMERA WITHIN DESIGNATED RANGE |

TRAJECTORY GENERATION SYSTEM AND TRAJECTORY GENERATING METHOD

CROSS-REFERENCE TO RELATED APPLICATIONS

This application claims priority to Japanese Patent Application No. 2018-234297 filed on Dec. 14, 2018, which is incorporated herein by reference in its entirely including the specification, drawings and abstract.

BACKGROUND

1. Technical Field

The disclosure relates to a trajectory generation system and a trajectory generating method. For example, the disclosure relates to a trajectory generation system and a trajectory generating method, for generating a trajectory on which a mobile body, such as a robot, moves to a target position.

2. Description of Related Art

A trajectory generation system disclosed in Japanese Patent No. 5724919 (JP 5724919 B) includes a computing unit that generates a trajectory on which a mobile body, such as a robot, does not interfere with an obstacle, and a storage means that stores the trajectory. The trajectory generation system of JP 5724919 B selects a trajectory suited for the current environment, from a plurality of trajectories stored in the storage means. Then, the system extracts a trajectory portion that does not interfere with any obstacle, from the selected trajectory, and connects its opposite ends, from which branches are extended, to a start position and a goal position of the trajectory of the mobile body, thereby to generate a final single trajectory.

SUMMARY

In some cases, it takes the trajectory generation system of JP 5724919 B a considerably long time to compute the trajectory. Thus, it has been desired to provide a trajectory generation system used for generating a trajectory of a mobile body having a gripper, which system can reduce the computation time while curbing reduction of the accuracy, when it generates a trajectory of the mobile body or its gripper to a goal position "suitable for gripping".

The disclosure provides a trajectory generation system and a trajectory generating method, which make it possible to reduce the computation time wink curbing reduction of the accuracy.

A trajectory generation system according to a first aspect of the disclosure includes a computing unit that performs computations for generating a trajectory on which a mobile body or a gripper of the mobile body moves from a start position to a target position, and an evaluating unit that evaluates a plurality of trajectory candidates used for generating the trajectory. The computing unit generates the trajectory candidates leading to a target area including the target position and a vicinity of the target position, with a plurality or degrees or freedom associated with predetermined grip conditions, within at least one of a range in which the trajectory candidates are allowed to be computed in a predetermined period, a range in which the trajectory candidates are allowed to be computed in a predetermined processing amount, and a range in which a predetermined number of the trajectory candidates are allowed to be computed. The evaluating unit conducts evaluation of the trajectory candidates generated by the computing unit, based on an evaluation item, and the computing unit generates the trajectory, using one of the trajectory candidates selected based on the evaluation. With this configuration, the trajectory generation system can generate a large number of trajectory candidates, while curbing reduction of the accuracy in computation. Also, the computing unit may generate the trajectory candidates leading to a target area including the target position and a vicinity of the target position, with a plurality of degrees of freedom associated with predetermined grip conditions, within one of a range in which the trajectory candidates are allowed to be computed in a predetermined period, a range in which the trajectory candidates are allowed to be computed in a predetermined processing amount, and a range in which a predetermined number of the trajectory candidates are allowed to be computed.

The computing unit may connect a part closer to the start position, of the trajectory candidate selected based on the evaluation, as an infinitesimal trajectory on which the mobile body or the gripper moves in the predetermined period, to the start position or an immediately preceding infinitesimal trajectory at regular intervals of the predetermined period, and generate the trajectory by sequentially connecting the infinitesimal trajectories from the start position. With this configuration, the mobile body can be smoothly moved in real time with generation of the trajectory.

Further, the computing unit may generate the trajectory candidates leading to the target area, from the start position or one side closer to the target position, of the immediately preceding infinitesimal trajectory. With this configuration, the computing unit can generate as many trajectory candidates as possible, within the range in which they can be computed in the predetermined period.

The mobile body may have a main body, a link and a joint which connect the gripper to the main body, and a camera having an angle of view that is variable. The computing unit may generate the trajectory candidates, using a first restraint condition that keeps at least one of a position of the mobile body, a position of the link, a rotational angle of the joint, and the angle of view, within a predetermined range, as the predetermined grip conditions. With this configuration, the computing unit generates the trajectory candidates based on the first restraint condition, so that movements of joints, etc. can be restricted, and the generation time can be reduced.

The evaluating unit may include a condition of a trajectory length which provides a higher evaluation as a length of the trajectory candidate is smaller, or a second restraint condition that gives a higher evaluation to a state desired to be fulfilled as far as possible, in the evaluation items. With this configuration, the position and posture of the mobile body, etc., can be controlled to preferable ones.

Further, the trajectory generation system may further include a checking unit that checks feasibility of each of the trajectory candidates in terms of avoidance of interference. The checking unit may check the feasibility sequentially from the trajectory candidate selected based on the evaluation, and select the trajectory candidate that satisfies the feasibility. The computing unit may generate the trajectory using the trajectory candidate selected by the checking unit. With this configuration, the feasibility of the trajectory candidates can be ensured through evaluation and checking of the candidates.

The trajectory generation system may further include an optimizing unit that optimizes driving of the mobile body or die gripper, to make the mobile body or the gripper movable on the trajectory generated by the computing unit. With this arrangement, the mobile body and the gripper can be smoothly moved.

The computing unit may generate the trajectory candidates using analytical solutions. With this configuration, the computing unit can compute the trajectory candidates at a high speed; therefore, it can generate the trajectory in real time with movements of the mobile body and the gripper.

A trajectory generating method according to a second aspect of the disclosure includes generating a plurality of trajectory candidates leading to a target area including a target position of a mobile body or a gripper of the mobile body and a vicinity of the target position, with a plurality of degrees of freedom associated with predetermined grip conditions, within at least one of a range in which the trajectory candidates are allowed to be computed in a predetermined period, a range in which the trajectory candidates are allowed to be computed in a predetermined processing amount, and a range in which a predetermined number of the trajectory candidates are allowed to be computed, conducting evaluation of the trajectory candidates generated, based on an evaluation item, and performing computations for generating a trajectory on which the mobile body or the gripper of the mobile body moves from a start position to the target position, using one of the trajectory candidates selected based on the evaluation.

According to this disclosure, the trajectory generation system that can reduce the computation time while curbing reduction of the accuracy can be provided.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 4 is a view indicating, by way of example, grip conditions used by the trajectory generation system according to the embodiment;

DETAILED DESCRIPTION OF EMBODIMENTS

One embodiment of the disclosure will be described with reference to the drawings. It is, however, to be understood that the disclosure is not limited to the embodiment as follows. Also, the following description and the drawings are simplified as needed, for the sake of clarity of explanation.

A trajectory generation system according to the embodiment will be described. The trajectory generation system of this embodiment generates a trajectory on which a gripper, such as a hand, of a mobile body, such as a robot, is moved, for example. Initially, the configuration of the mobile body including the trajectory generation system will be described. Then, a method of generating trajectories of the mobile body and the gripper by the trajectory generation system will be described.

Figure 1:
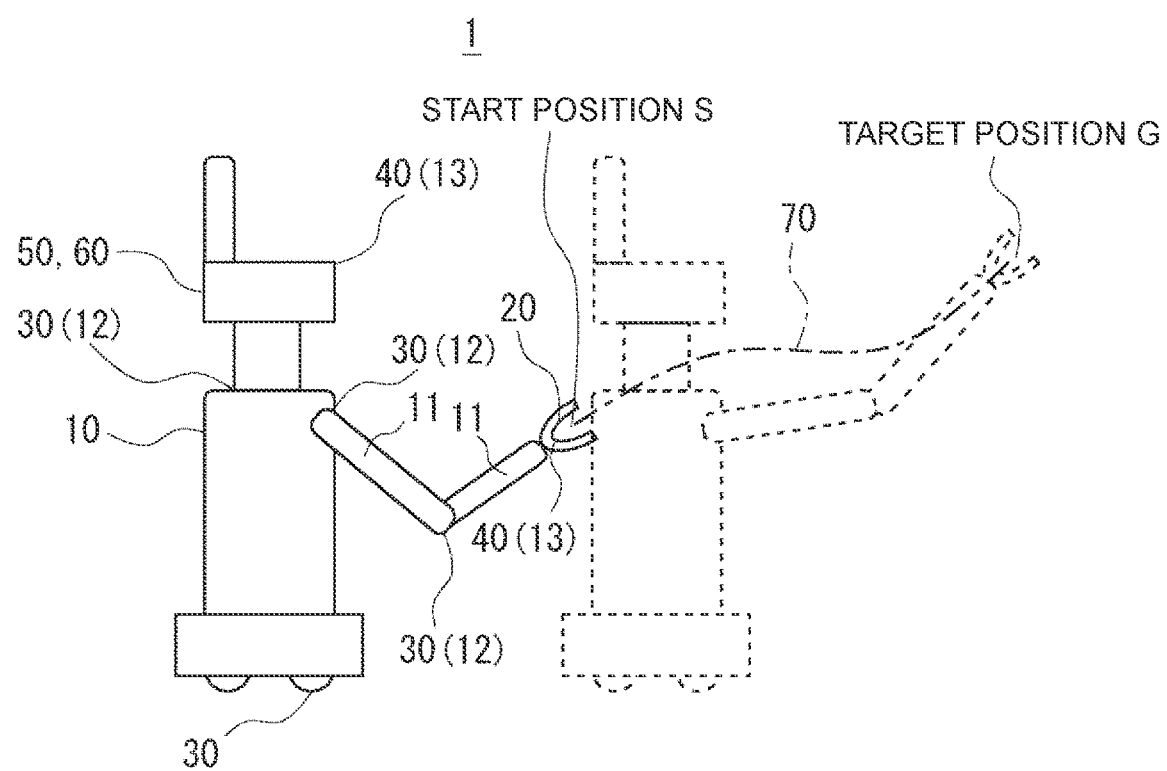
FIG. 1 is a view showing the configuration of a mobile body according to one embodiment.
Figure 2:
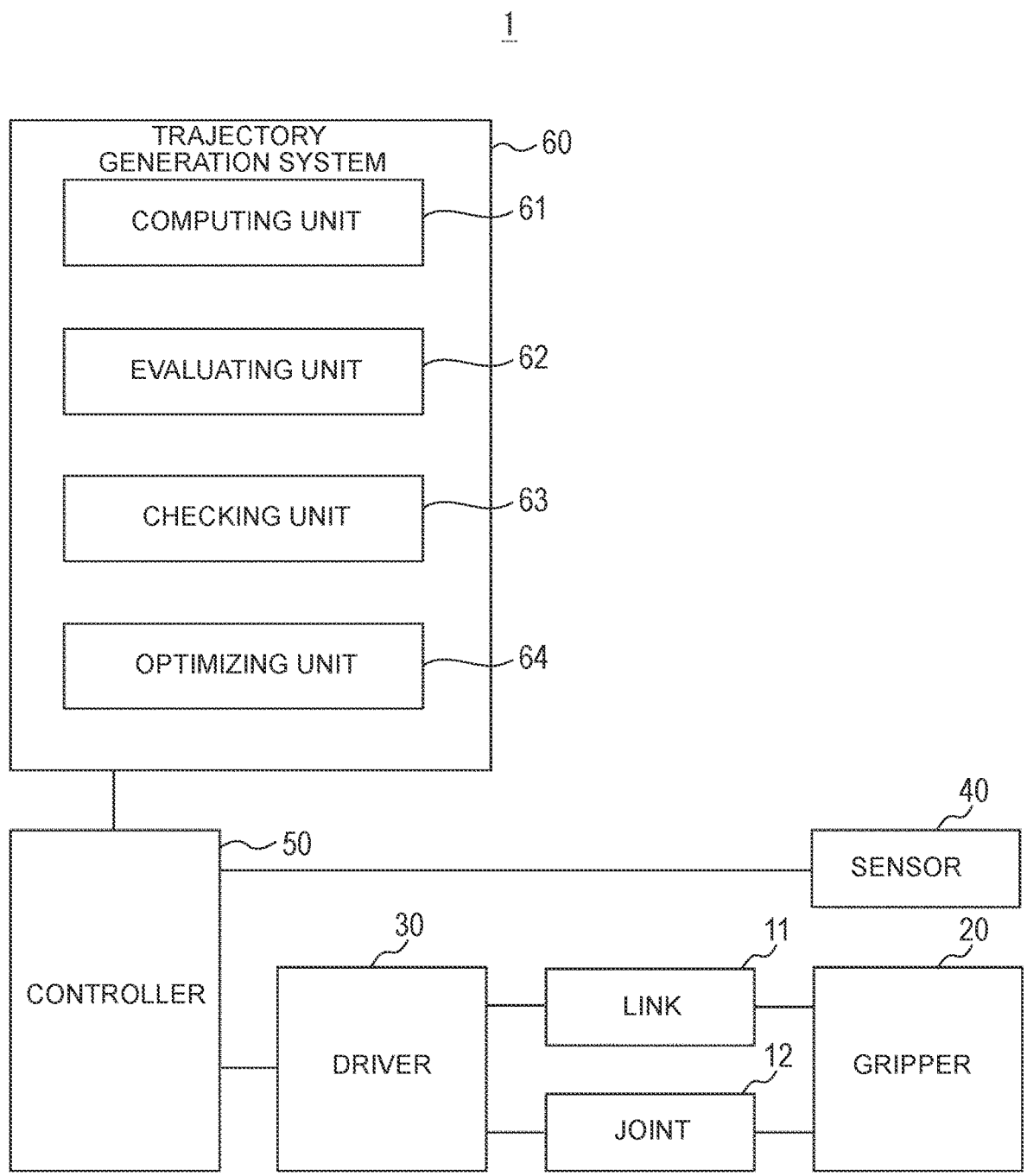
FIG. 2 is a block diagram showing the configuration of the mobile body according to the embodiment.

FIG. 1 shows the configuration of the mobile body 1 according to the embodiment. FIG. 2 is a block diagram showing the configuration of the mobile body 1 according to the embodiment. As shown in FIG. 1 and FIG. 2, the mobile body 1 includes a main body 10 (not shown in FIG. 2), links 11, joints 12, gripper 20, drivers 30, sensors 40, controller 50, and trajectory generation system 60. The mobile body 1 is, for example, a robot.

The main body 10 provides a torso of the mobile body 1. The gripper 20 of the mobile body 1 is attached to the main body 10. Also, wheels and a motor for rotating the wheels are mounted below the main body 10, as the driver 30 for moving the main body 10. For example, the main body 10 moves as the wheels rotate. The driver 30 for moving the main body 10 is not limited to the wheels and the motor for rotating the wheels, but may be a leg portion, or the like, which permits walking on two legs.

The links 11 and joints 12 are provided between the main body 10 and the gripper 20. The gripper 20 is attached to the main body 10, via the links 11 and joints 12. Each of the links 11 is a rod-like member, for example, and plays the role of a bone. Each of the joints 12 rotatably couples members, such as the main body 10 and the link 11, the link 11 and the link 11, or the link 11 and the gripper 20, with each other. The joint 12 is provided with the driver 30. The driver 30 of the joint 12 is an actuator, for example. The joint 12 rotates when it is driven by the driver 30.

The gripper 20 is, for example, the hand of the robot. The gripper 20 is attached to the main both 10, via the links 11 and the joints 12. Thus, the gripper 20 moves due to rotation of the joints 12.

The drivers 30 include the wheels mounted below the main body 10 and the motor that rotates the wheels, and actuators that rotate the joints 12. As the main body 10 moves, the gripper 20 also moves.

The sensor 40 detects the position of the mobile body 1. More specifically, the sensor 40 detects the positions of the main body 10 and the gripper 20. For example, the sensor 40 is a camera 13 that is mounted above the main body 10, and takes images of the main body 10, gripper 20, and their surroundings. The camera 13 is attached to the main body 10 via the joint 12. The camera 13 can change the imaging direction by the driver 30 of the joint 12. Also, the sensor 40 may be a camera 13 mounted on the gripper 20. The camera 13 of the gripper 20 takes an image of an object to be gripped. The camera 13 of the gripper 20 can change the imaging direction as the gripper 20 moves. The angle of view of the camera 13 is variable, and the camera 13 can take an image of an object close to the camera 13, or an object far from the camera 13. The sensor 40 detects the positions of the main body 10 and the gripper 20, based on images taken by the camera 13.

The sensor 40 may be in the form of encoders provided on the motor and actuators in the drivers 30. The sensor 40 may detect the positions of the main body 10 and the gripper 20, based on measured rotation signals. Further, the sensor 40 obtains the rotational angles of the joints 12. The sensor 40 outputs the position information and rotational angle information thus detected, to the controller 50.

The sensor 40 also detects the velocity (speed and direction) and angular velocity (speed and direction) of the mobile body 1. More specifically, the sensor 40 detects the velocities and angular velocities of the main body 10 and the gripper 20. The sensor 40 may detect the velocities and angular velocities of the main body 10 and the gripper 20, from a plurality of images taken at given intervals by the camera 13, or may detect the velocities and angular velocities of the main body 10 and the gripper 20, by use of the encoders provided on the motor and actuators. The sensor 40 outputs the detected velocity information and angular velocity information, to the controller 50.

The controller 50 controls motion of the mobile body 1. The controller 50 controls movements of the main body 10 and the gripper 20, based on the positions, rotational angles, velocities (speeds and directions), and angular velocities (speeds and directions) of the main body 10 and gripper 20 detected by the sensor 40. More specifically, the controller 50 controls the angular velocities of rotation of the motor and the joints 12, thereby to control movements of the main body 10 and the gripper 20. The controller 50 is a general-purpose computer, for example.

The trajectory generation system 60 includes a computing unit 61, evaluating unit 62, checking unit 63, and optimizing unit 64.

The computing unit 61 performs computations for generating a trajectory 70 on which the mobile body 1 or the gripper 20 of the mobile body 1 is moved from a start position S to a target position G. More specifically, the computing unit 61 generates a plurality of trajectory candidates, and generates the trajectory 70 from the generated trajectory candidates.

Figure 3:
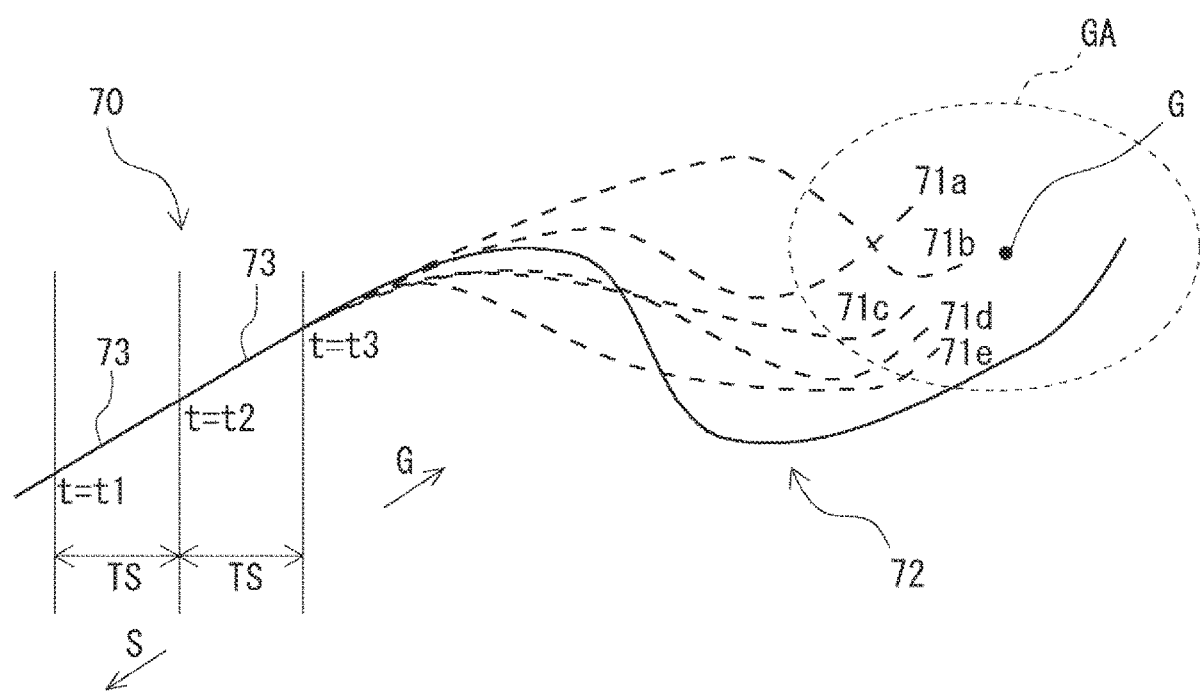
FIG. 3 is a view showing, by way of example, trajectory candidates generated by a computing unit of a trajectory generation system according to the embodiment.

FIG. 3 shows trajectory candidates generated by the computing unit 61 of the trajectory generation system 60 according to the embodiment. As shown in FIG. 3, the computing unit 61 performs computations for generating a plurality of trajectory candidates 71a-71e leading to a target area GA including the target position G and the vicinity of the target position G. Each of the trajectory candidates 71a-71e has the potential to be the trajectory 70 to the target position G. The trajectory candidates 71a-71e can be connected to the trajectory 70 on which the mobile body 1 or the gripper 20 moves in real time. For example, there are several hundreds of trajectory candidates, and some of the trajectory candidates 71a-71e are illustrated in FIG. 3 by way of example.

The computing unit 61 generates the trajectory candidates 71a-71e directed to the target area GA having a certain range including the target position G and its vicinity, rather than generating the trajectory 70 directed to one point as the target position G. The range of the vicinity may change for each computation. For example, when the start position S is far from the target position G, the range of the vicinity may be wide. When the start position S is close to the target position G, the range of the vicinity may be narrow. The range of the vicinity may also be determined in association with a predetermined grip condition or conditions. By generating the trajectory candidates 71a-71e directed to the target area GA, the computing unit 61 can generate the trajectory 70 on which the mobile body 1 or the gripper 20 is moved in real time, while assuring a certain degree of accuracy sufficient to provide the trajectory 70.

The computing unit 61 generates the trajectory candidates 71a-71e, with a plurality of degrees of freedom associated with predetermined grip conditions. The predetermined grip conditions mean conditions for keeping the position and posture of the mobile body 1, positions of the links 11, rotational angles of the joints 12, angles of view of the cameras 13, etc. within predetermined ranges. A plurality of degrees of freedom is associated with the predetermined grip conditions. For example, a plurality of degrees of freedom corresponding to a plurality of positions within a predetermined range can be set for the condition for keeping the position of the mobile body 1 within the predetermined range. For example, a plurality of degrees of freedom corresponding to a plurality of angles within a predetermined range can be set for the condition for keeping the rotational angle of the joint 12 within the predetermined range.

FIG. 4 indicates, by way of example, grip conditions used by the trajectory generation system 60 according to the embodiment. As shown in FIG. 4, the grip conditions may be classified into, for example, four restraint conditions, namely, first restraint conditions (hard restraint conditions) for goal, second restraint conditions (soft restraint conditions) for goal, first restraint conditions (hard restraint conditions) for path, and second restraint conditions (soft restraint conditions) for path. The first restraint conditions for goal and the second restraint conditions for goal are restraint conditions used when the gripper 20 grips an object to be gripped. The first restraint conditions for path and the second restraint conditions for path are restraint conditions concerning the trajectory 70 taken before the gripper 20 grips the object.

The first restraint conditions for goal mean conditions or states in which the mobile body 1 and the gripper 20 must be placed at the target position G of the trajectory 70, for example. One specific example of the conditions is that the gripper 20 is located at a position where it can grasp the object to be gripped. The second restraint conditions for goal mean conditions or states desired to be fulfilled as for as possible by the mobile body 1 and the gripper 20 at the target position G of the trajectory 70, for example. One specific example of the conditions is that the mobile body 1 does not have its posture extended too much.

The first restraint conditions for path mean conditions or states in which the mobile body 1 and the gripper 20 must be placed over the entire length of the trajectory 70, for example. One specific example of the conditions is that the gripper 20 follows a straight-line trajectory when it pulls a drawer of a desk, for example. The second restraint conditions for path mean conditions or states desired to be fulfilled as far as possible by the mobile body 1 and the gripper 20 over the entire length of the trajectory 70, for example. One specific example of the conditions is that the mobile body 1 is kept from moving its hand as for as possible, during its movement.

Figures 5, 6:
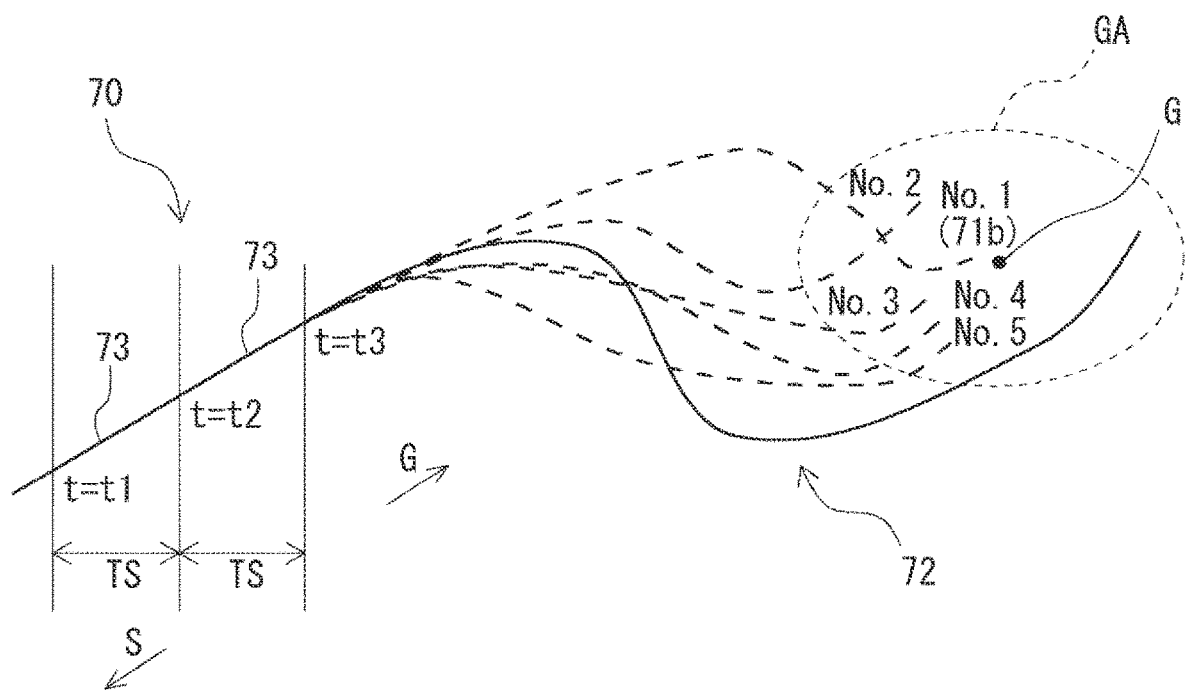
FIG. 5 is a view indicating, by way of example, types of restraint conditions used by the trajectory generation system according to the embodiment.
FIG. 6 is a view showing the results obtained by an evaluating unit when it evaluates the trajectory candidates generated by the computing unit, in the trajectory generation system according to the embodiment.

FIG. 5 indicates, by way of example, the types of the restraint conditions used by the trajectory generation system 60 according to this embodiment. As shown in FIG. 5, the types of the restraint conditions include, for example, "TSR" restraint conditions, "RangeJoint" restraint conditions, and "Visibility") restraint conditions.

The "TSR" restraint conditions, which are related to the links 11, mean conditions for keeping the positions and postures of the links 11 and the position and posture of the gripper 20 within given ranges. For example, the "TSR" restraint conditions may be expressed as a six-dimensional hypercube (position in the X-axis direction, position in the Y-axis direction, position in the Z-axis direction, rotation about the ω axis, rotation about the θ axis, and rotation about the φ axis). Thus, the trajectory of door opening, for example, can be represented by a single trajectory. The "TSR" restraint conditions may be used as any of the four sets of restraint conditions, i.e., the first restraint conditions for goal through the second restraint conditions for path as mentioned above.

The "RangeJoint" restraint conditions, which are related to the joints 12, mean conditions for keeping the joints 12 within given ranges. With these restraint conditions, the positions and directions of the mobile body 1, links 11, and camera 13 can be expressed. The "RangeJoint" restraint conditions may also be used as any of the four sets of restraint conditions, i.e., the first restraint conditions for goal through the second restraint conditions for path.

The "Visibility" restraint conditions, which are related to the angles of view of the cameras 13, mean conditions for keeping the designated coordinates in the field of view of the designated camera 13. The "Visibility" restraint conditions may be used as any of the four sets of restraint conditions, i.e., the first restraint conditions for goal through the second restraint conditions for path.

The computing unit 61 generates the trajectory candidates 71a to 71e, with a plurality of degrees of freedom associated with the predetermined first restraint conditions for goal and first restraint conditions for path. The computing unit 61 generates the trajectory candidates 71a to 71e, using the first restraint conditions for keeping at least one of the position of the mobile body 1, positions of the links 11, rotational angles of the joints 12, and the angles of view of the cameras 13, within the predetermined range or ranges, as the predetermined grip conditions.

The method by which the computing unit 61 generates the trajectory candidates 71a-71e is not limited to any particular method. For example, the method may be a trajectory generating method based on analytical solutions, for computing the trajectory candidates 71a-71e using analytical solutions of rotary movements about three axes that run at right angles to one another, in a manipulator that consists of the links 11 and the joints 12, for example, or may be a memory-based trajectory generating method using a look-up table, or the like. It is desirable that the computing unit 61 generates the trajectory candidates, using analytical solutions described in Japanese Unexamined Patent Application Publication No. 2017-42868 (JP 2017-42868 A). Since the trajectory generating method based on the analytical solutions permits high-speed computations, the trajectory 70 can be generated in real time with movements of the mobile body 1 and the gripper 20.

The computing unit 61 generates a plurality of trajectory candidates 71a-71e within a range in which the candidates are allowed to be computed in a predetermined period TS. The predetermined period TS is a period in which the computing unit 61 generates several hundreds of trajectory candidates 71a-71e, for example. The predetermined period TS is, for example, 200 milliseconds (ms). The computing unit 61 generates the trajectory candidates 71a-71e, at regular intervals of the predetermined period TS. Also, the computing unit 61 may generate the trajectory candidates 71a-71e, within a range in which the candidates are allowed to be computed in a predetermined processing amount. Further, the computing unit 61 may generate the trajectory candidates 71a to 71e, within a range in which a predetermined number of trajectory candidates are allowed to be computed. Thus, the computing unit 61 generates a plurality of trajectory candidates leading to the target area GA including the target position G and the vicinity of the target position G, with a plurality of degrees of freedom associated with predetermined grip conditions, within at least one of the range in which the candidates are allowed to be computed in the predetermined period, the range in which they are allowed to be computed in the predetermined processing amount, and the range in which the predetermined number of trajectory candidates are allowed to be computed. The predetermined period, predetermined processing amount, and predetermined number are only required to satisfy a condition that the trajectory candidates can be generated, and may be a set period, set processing amount, and set number, which have been set and determined. The computing unit 61 may also generate a plurality of trajectory candidates leading to the target area GA including the target position G and the vicinity of the target position G, with a plurality of degrees of freedom associated with the predetermined grip conditions, within any range of the range in which the candidates are allowed to be computed in the predetermined period, the range in which they are allowed to be computed in the predetermined processing amount, and the range in which the predetermined number of trajectory candidates are allowed to be computed.

For example, the trajectory candidates 71a-71e are generated in the predetermined period TS between time t2 and time t3, as shown in FIG. 3. Then, by the time when time t3 is reached, the trajectory 70 is selected from the trajectory candidates 71a-71e. A trajectory 72 on which the mobile body 1 or the gripper 20 moves, between time t2 and time t3, was generated between time t1 and time t2. Thus, the computing unit 61 periodically generates the trajectory candidates 71a-71e that can be connected in the next period (from time t3) to the trajectory 70 of the current time (time t2 to time t3). The computing unit 61 generates various trajectory candidates 71a-71e that satisfy the predetermined first restraint conditions, as many as possible in a single predetermined period TS.

The evaluating unit 62 performs evaluation on the trajectory 70. More specifically, the evaluating unit 62 evaluates the generated trajectory candidates 71a-71e, based on an evaluation item or items.

FIG. 6 shows the results obtained when the evaluating unit 62 evaluated the trajectory candidates 71a-71e generated by the computing unit 61, in the trajectory generation system 60 according to this embodiment. As shown in FIG. 6, the evaluating unit 62 ranks the trajectory candidates 71b, 71a, 71c, 71d and 71e, as No. 1 to No. 5, based on the evaluation items. The evaluation items used by the evaluating unit 62 for ranking include the second restraint conditions preferably satisfied as far as possible, for example. Also, the evaluation items include a condition of the trajectory length. The condition of the trajectory length is that the evaluation of the trajectory candidate 71a-71e is higher as the trajectory length is smaller. The trajectory length is the length measured along each of the trajectory candidates 71a-71e.

The checking unit 63 checks feasibility of each of the trajectory candidates 71a-71e in terms of avoidance of interference. The checking unit 63 checks the feasibility from the trajectory candidate 71b receiving the highest evaluation, out of the trajectory candidates 71a-71e evaluated by the evaluating unit 62. The feasibility indicates whether the trajectory candidate in question is successfully established as a trajectory. For example, the feasibility is determined by determining whether the trajectory candidate successfully avoids interference. Namely, when the trajectory candidate 71a-71e avoids interference, the feasibility is satisfied. More specifically, the checking unit 63 performs 3D interference checking or 2D interference checking using a map. Then, the checking unit 63 selects the trajectory candidate 71b that satisfies the feasibility.

Figure 7:
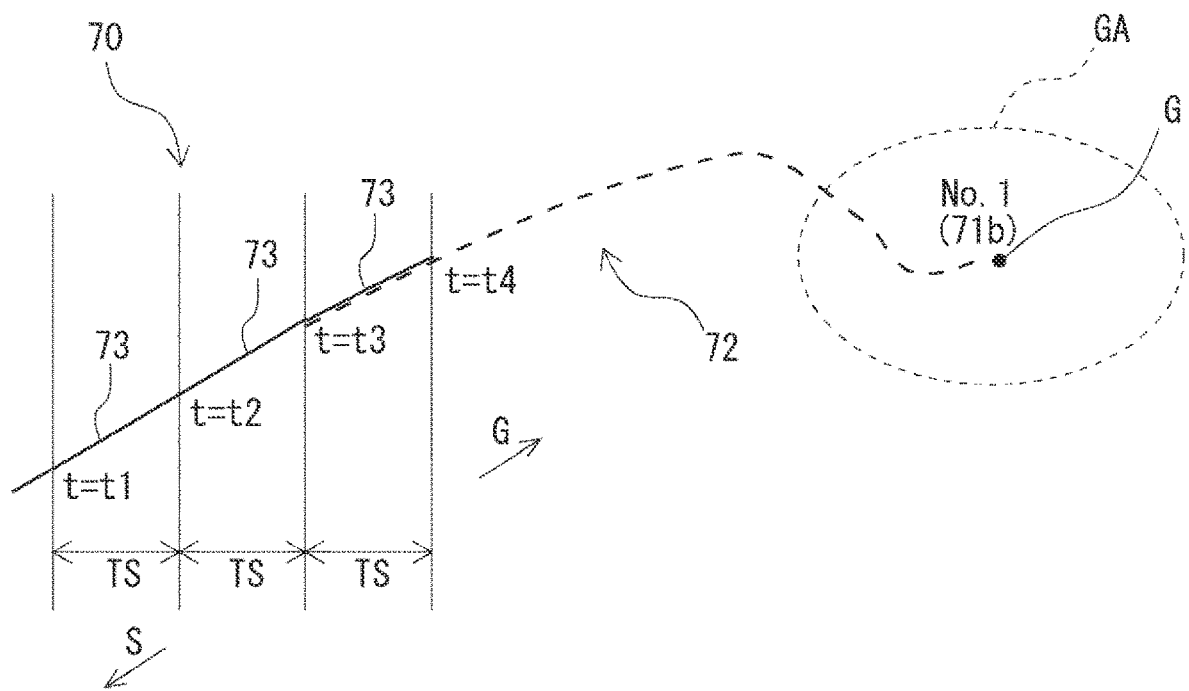
FIG. 7 is a view showing a trajectory candidate generated by the computing unit of the trajectory generation system according to the embodiment.

FIG. 7 shows, by way of example, the trajectory candidate 71b generated by the computing unit 61 of the trajectory generation system 60 according to the embodiment. As shown in FIG. 7, the computing unit 61 generates the trajectory 70, using the trajectory candidate 71b selected based on evaluation. Or the computing unit 61 generates the trajectory, using the trajectory candidate 71b selected by the checking unit 63. More specifically, the computing unit 61 connects a part closer to the start position S, of the highly evaluated trajectory candidate 71b, or the trajectory candidate 71b selected by the checking unit 63, as an infinitesimal trajectory 73, to the start position S or an immediately preceding infinitesimal trajectory 73, at regular intervals of the predetermined period TS. More specifically, the computing unit 61 connects a part closer to the start position S, of the trajectory candidate 71b, as the infinitesimal trajectory 73 on which the mobile body 1 or gripper 20 travels between time t3 and time t4, to the trajectory 70 generated until time t3 is reached.

In this manner, the computing unit 61 generates the trajectory 70 by sequentially and periodically connecting a plurality of infinitesimal trajectories 73 from the start position S side. The infinitesimal trajectory 73 is a portion of the trajectory candidate 71b on which the mobile body 1 or gripper 20 moves in the predetermined period TS.

Figure 8:
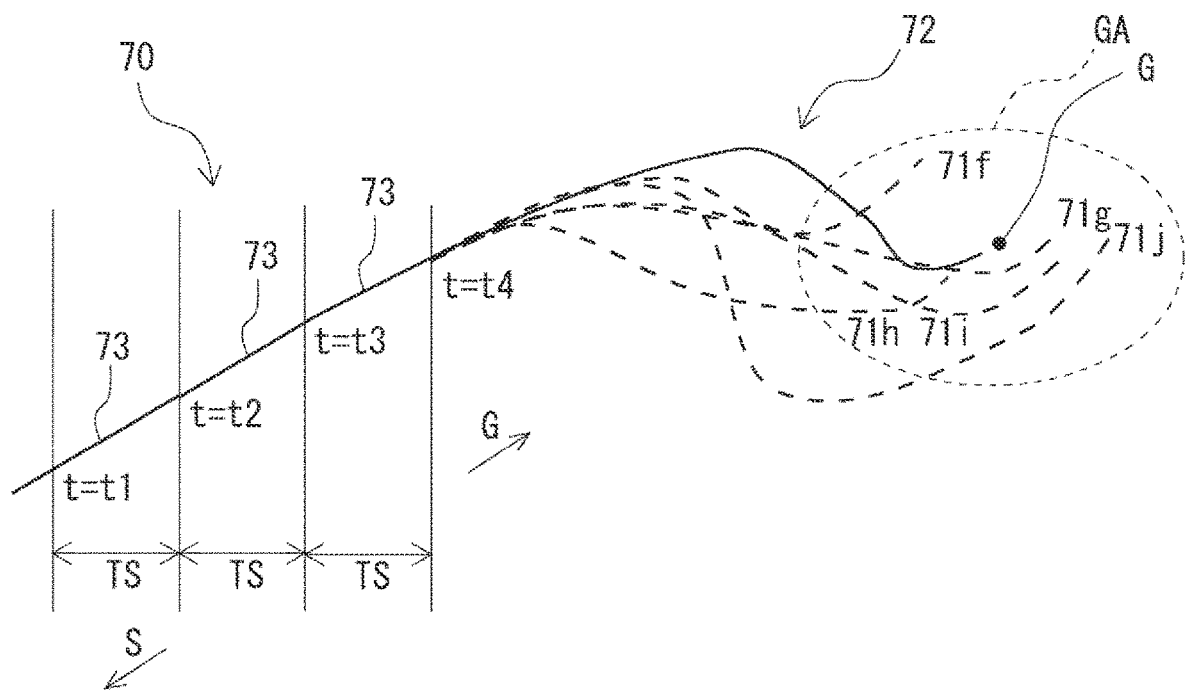
FIG. 8 is a view showing trajectory candidates generated by the computing unit of the trajectory generation system according to the embodiment.

FIG. 8 shows, by way of example, trajectory candidates 71f-71j generated by the computing unit 61 of the trajectory generation system 60 according to the embodiment. As shown in FIG. 8, in the next predetermined period TS (time t3 to time t4), the computing unit 61 generates the trajectory candidates 71f-71j. At this time, the computing unit 61 generates the trajectory candidates 71f-71j leading to the target area GA, from the target position G side (position at time t4) of the immediately preceding infinitesimal trajectory 73. The computing unit 61 repeats generation of the trajectory candidates until the mobile body 1 or gripper 20 reaches the target position G.

The optimizing unit 64 optimizes driving of the mobile body 1 or gripper 20, so that the mobile body 1 or gripper 20 can move on the generated trajectory at the highest permissible velocity. More specifically, the optimizing unit 64 controls the drivers 30, so as to optimize driving of the main body 10, links 11, joints 12, and cameras 13. The optimizing unit 64 optimizes driving of the drivers 30, so that the mobile body 1 or the gripper 20 can actually move on the generated geometric trajectory 70, at the highest permissible velocity.

Trajectory Generating Method

Figure 9:
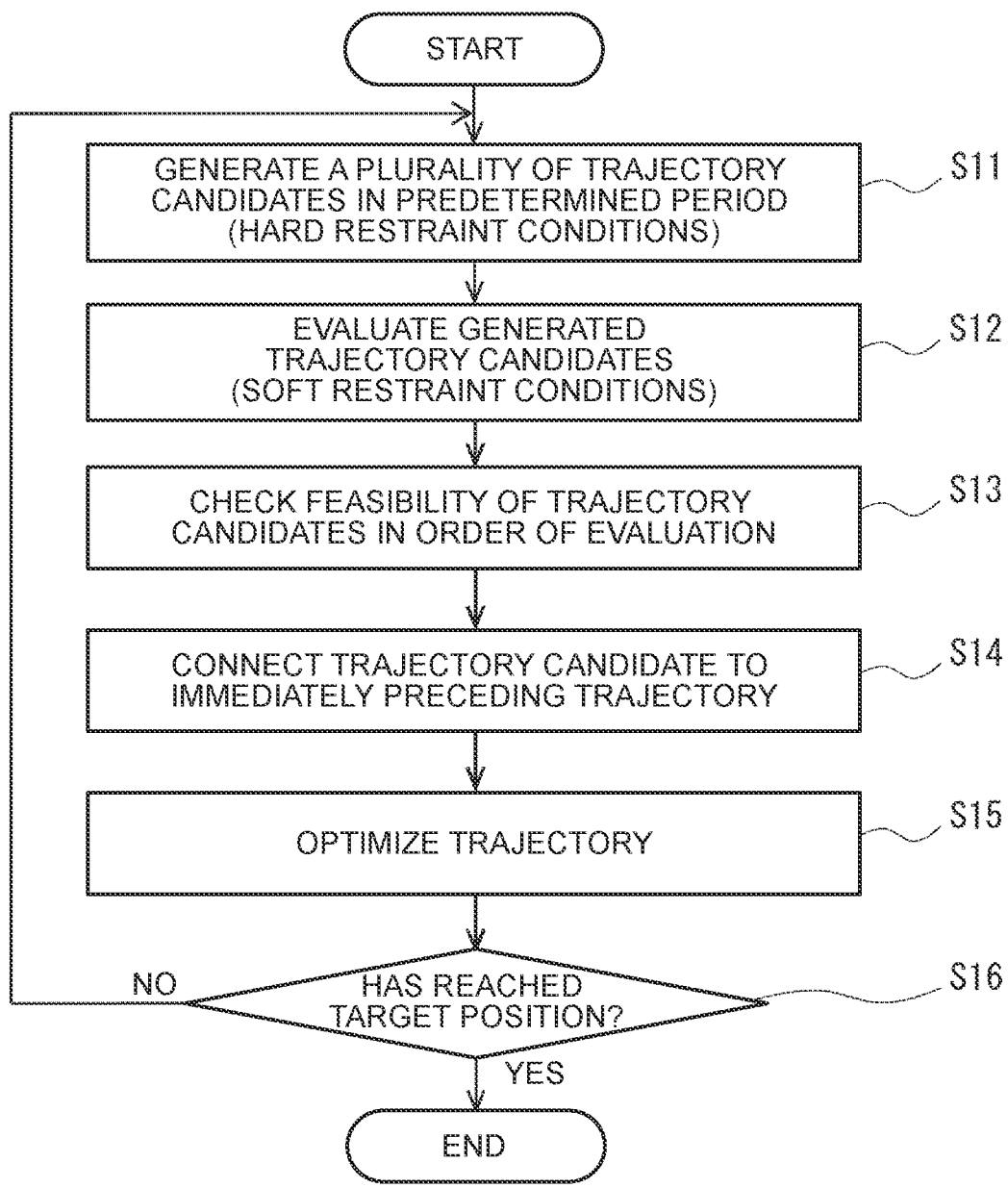
FIG. 9 is a flowchart illustrating a trajectory generating method according to the embodiment.

Next, a trajectory generating method will be described. FIG. 9 is a flowchart illustrating the trajectory generating method according to the embodiment. As shown in step S11 of FIG. 9, a plurality of trajectory candidates 71a-71e are generated in the predetermined period TS. More specifically, the computing unit 61 generates the trajectory candidates 71a-71e leading to the target area GA, with a plurality of degrees of freedom associated with the predetermined grip conditions. The computing unit 61 generates as many trajectory candidates 71a-71e as possible, within a range in which the candidates are allowed to be computed in the predetermined period TS. The predetermined period TS is, for example, 200 milliseconds. Also, the computing unit 61 generates the trajectory candidates 71a-71e, based on the first restraint conditions, as the predetermined grip conditions, for example. In this connection, the computing unit 61 may generate the trajectory candidates 71a-71e within the range in which the candidates are allowed to be computed in the predetermined processing amount, or may generate the trajectory candidates 71a-71e within the range in which a predetermined number of trajectory candidates are allowed to be computed.

Next, as shown in step S12, the trajectory candidates 71a-71e thus generated are evaluated. The evaluating unit 62 evaluates the generated trajectory candidates 71a-71e, based on the evaluation item or items. The evaluation items include the condition of the trajectory length, or the second restraint conditions, for example. In this connection, the evaluation items are not limited to the condition of the trajectory length and the second restraint conditions, but other evaluation items may be used.

Then, as shown in step S13, the feasibility of the trajectory candidates 71a-71e is checked in the order of evaluation. The checking unit 63 checks the feasibility of the trajectory candidates 71a-71e evaluated by the evaluating unit 62, in the order from the trajectory candidate 71b receiving the highest evaluation. The checking unit 63 selects the trajectory candidate 71b that satisfies the feasibility. Then, the checking unit 63 outputs the selected trajectory candidate 71b.

Then, as shown in step S14, the trajectory candidate 71b is connected to the immediately preceding trajectory 70. The computing unit 61 generates the trajectory 70, using the trajectory candidate 71b selected b the checking Unit 63, etc. More specifically, the computing unit 61 connects a part closer to the start position S, of the trajectory candidate 71b receiving a high evaluation from the evaluating unit 62 and selected by the checking unit 63, as an infinitesimal trajectory 73, to the immediately preceding infinitesimal trajectory 73. In this manner, a plurality of infinitesimal trajectories 73 is sequentially and periodically connected from the start position S side, so as to generate the trajectory 70. Thus, the trajectory 70 consists of the infinitesimal trajectories 73.

Then, as shown in step S15, the trajectory 70 is optimized. The optimizing unit 64 optimizes driving of the mobile body 1 or the gripper 20, so that the mobile body 1 or the gripper 20 can move on the generated trajectory 70, at the highest permissible velocity.

Then, as shown in step S16, it is determined whether the mobile body 1 or the gripper 20 has reached the target position G. The computing unit 61 determines whether the mobile body 1 or the gripper 20 has reached the target position G, by comparing the position of the mobile body 1 or the gripper 20, with the target position G. The computing unit 61 returns to step S11 when it determines that the mobile body 1 or the gripper 20 has not reached the target position G. Then, the process is repeated. Namely, the computing unit 61 generates a plurality of trajectory candidates 71f-71j leading to the target area GA, from the target position G side of the infinitesimal trajectory 73.

On the other hand, when the computing unit 61 determines in step S16 that the mobile body 1 or the gripper 20 has reached the target position G, it finishes the process. In this manner, the trajectory generation system 60 can generate the trajectory 70.

Next, the effects of this embodiment will be described. In this embodiment, the computing unit 61 generates a plurality of trajectory candidates 71a-71e leading to the target area GA including the target position G and the vicinity of the target position G. Since the target position G is extended to the target area GA including its vicinity, the computing unit 61 can generate many trajectory candidates 71a-71e, while curbing reduction of the computation accuracy to a certain level. Also, since the target position G is expanded to the target area GA including its vicinity, the computation time required to generate a single trajectory candidate can be shortened, and the computing unit 61 can generate as many trajectory candidates 71a-71e as possible in the predetermined period TS.

Also, since the trajectory candidates 71a-71e are generated based on the first restraint conditions, the movements of the joints 12, etc. can be restricted, and the computation time can be reduced. Thus, the trajectory candidates 71a-71e can be generated in the predetermined period TS permitted. The trajectory candidates 71a-71e are evaluated and checked, so as to be surely established as the trajectory, though the accuracy is kept at a certain, level. Thus, the mobile body 1, such as a robot, can be smoothly moved, in real time with generation of the trajectory 70.

Conventional trajectory generation systems are classified into two categories, i.e., global trajectory generation systems, such as a rapidly exploring random tree (RRT), and a probabilistic roadmap (PRM), and trajectory generation systems of differential kinematics using Jacobian, for example. The global trajectory generation system searches the whole of the trajectory 70 from the start position S to the target position G; therefore, it takes a long time to generate the trajectory 70.

In this embodiment, the target position G is expanded to the target area GA including the vicinity of the target post on G, and the system generates as many trajectory candidates 71a-71e as possible. Thus, the accuracy in computation for generating the trajectory 70 can be kept at a certain level, and the computation time can be reduced.

The evaluating unit 62 includes the second restraint conditions as the evaluation items. Thus, the position, posture, etc. of the mobile body 1 can be controlled to be preferable ones.

The computing unit 61 connects a part closer to the start position S, of the highly evaluated trajectory candidate 71b, as an infinitesimal trajectory 73, to the start position S or an immediately preceding infinitesimal trajectory 73; in this manner, the trajectory 70 is generated by sequentially and periodically connecting a plurality of infinitesimal trajectories 73 from the start position S side. Thus, the mobile body 1 or the gripper 20 can move smoothly on the trajectory 70.

While one embodiment of the disclosure has been described the disclosure is not limited to the above configuration, but the embodiment may be changed without departing from the technical concept of the disclosure. For example, the mobile body 1, such as a robot, including the trajectory generation system according to the embodiment is included in the technical concept of the disclosure.

What is claimed is:

1. A trajectory generation system comprising:
a computing unit programmed to perform computations for generating a trajectory on which a mobile body or a gripper of the mobile body moves from a start position to a target position; and
an evaluating unit programmed to evaluate a plurality of trajectory candidates used for generating the trajectory; wherein
the computing unit is further programmed to generate the trajectory candidates leading to a target area including the target position and a vicinity of the target position, with a plurality of degrees of freedom associated with predetermined grip conditions, the trajectory generation system continues to generate trajectory candidates until a predetermined first time period elapses or a predetermined amount of processing resources are used;
a range of the vicinity of the target position is smaller when the start position is closer to the target position compared to the range of the vicinity when the start position is further from the target position;
the evaluating unit is further programmed to conduct evaluation of the trajectory candidates generated by the computing unit, based on an evaluation item; and
the computing unit is further programmed to generate the trajectory, using one of the trajectory candidates selected based on the evaluation.

2. The trajectory generation system according to claim 1, wherein the computing unit is further programmed to connect a part closer to the start position, of the trajectory candidate selected based on the evaluation, as an infinitesimal trajectory on which the mobile body or the gripper moves in the predetermined period, to the start position or an immediately preceding infinitesimal trajectory at regular intervals of the predetermined period, and generate the trajectory by sequentially connecting a plurality of the infinitesimal trajectories from the start position.

3. The trajectory generation system according to claim 2, wherein the computing unit is further programmed to generate the trajectory candidates leading to the target area, from the start position or one side closer to the target position, of the immediately preceding infinitesimal trajectory.

4. The trajectory generation system according to claim 1, wherein:
the mobile body has a main body, a link and a joint which connect the gripper to the main body, and a camera having an angle of view that is variable; and
the computing unit is further programmed to generate the trajectory candidates, using a first restraint condition that keeps at least one of a position of the mobile body, a position of the link, a rotational angle of the joint, and the angle of view, within a predetermined range, as the predetermined grip conditions.

5. The trajectory generation system according to claim 1, wherein the evaluating unit is further programmed to include a condition of a trajectory length which provides a higher evaluation as a length of the trajectory candidate is smaller, or a second restraint condition that gives a higher evaluation to a state desired to be fulfilled as far as possible, in the evaluation item.

6. The trajectory generation system according to claim 1, further comprising a checking unit programmed to check feasibility of each of the trajectory candidates in terms of avoidance of interference, wherein:
the checking unit checks the feasibility sequentially from the trajectory candidate selected based on the evaluation, and selects the trajectory candidate that satisfies the feasibility; and
the computing unit generates the trajectory using the selected trajectory candidate.

7. The trajectory generation system according to claim 1, further comprising an optimizing unit programmed to optimize driving of the mobile body or the gripper, to make the mobile body or the gripper movable on the generated trajectory.

8. The trajectory generation system according to claim 1, wherein the computing unit is further programmed to generate the trajectory candidates using analytical solutions.

9. A trajectory generating method comprising:
generating a plurality of trajectory candidates leading to a target area including a target position of a mobile body or a gripper of the mobile body and a vicinity of the target position, with a plurality of degrees of freedom associated with predetermined grip conditions, by continuing to generate trajectory candidates until a predetermined first time period elapses or a predetermined amount of processing resources are used;
conducting evaluation of the trajectory candidates generated, based on an evaluation item; and
performing computations for generating a trajectory on which the mobile body or the gripper of the mobile body moves from a start position to the target position, using one of the trajectory candidates selected based on the evaluations;
wherein, a range of the vicinity of the target position is smaller when the start position is closer to the target position compared to the range of the vicinity when the start position is further from the target position.

* * * * *